(12) United States Patent
Brusky

(10) Patent No.: US 6,285,406 B1
(45) Date of Patent: *Sep. 4, 2001

(54) POWER MANAGEMENT SCHEMES FOR APPARATUS WITH CONVERGED FUNCTIONALITIES

(75) Inventor: Kevin J. Brusky, Magnolia, TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,437

(22) Filed: Mar. 28, 1997

(51) Int. Cl.$^7$ ................................ H04N 5/63; H04N 7/00
(52) U.S. Cl. ..................... 348/552; 348/730; 348/554; 345/211; 345/212
(58) Field of Search ..................... 348/552, 705, 348/706, 554, 558, 730; 395/651, 652, 750.05, 750.06; 345/214, 211, 212; 455/38.3; 713/300, 320; H04N 5/63, 7/00

(56) References Cited

U.S. PATENT DOCUMENTS

| | | | |
|---|---|---|---|
| 4,628,541 | 12/1986 | Beavers | 455/603 |
| 4,658,247 | 4/1987 | Gharachorloo | 340/747 |
| 4,775,928 | 10/1988 | Kendall et al. | 364/747 |
| 4,954,819 | 9/1990 | Watkins | 340/721 |
| 5,170,159 | * 12/1992 | Kawabata et al. | 348/730 |
| 5,249,164 | * 9/1993 | Koz | 348/552 |
| 5,283,819 | * 2/1994 | Glick et al. | 379/93.01 |
| 5,291,275 | 3/1994 | Lumelsky | 348/441 |
| 5,355,490 | * 10/1994 | Kou | 395/700 |
| 5,451,981 | 9/1995 | Drako et al. | 345/118 |
| 5,471,577 | * 11/1995 | Lightbody et al. | 345/340 |
| 5,488,393 | 1/1996 | Wood et al. | 345/213 |
| 5,502,462 | 3/1996 | Mical et al. | 345/185 |
| 5,519,506 | * 5/1996 | D'Avello et al. | 358/400 |
| 5,543,824 | 8/1996 | Priem et al. | 345/201 |
| 5,555,032 | 9/1996 | Kung | 348/730 |
| 5,572,698 | 11/1996 | Yen et al. | 395/437 |
| 5,610,663 | 3/1997 | Nan et al. | 348/542 |
| 5,623,533 | * 4/1997 | Kikuchi et al. | 455/572 |
| 5,625,882 | * 4/1997 | Viik et al. | 455/38.3 |
| 5,650,831 | * 7/1997 | Farwell | 348/734 |

(List continued on next page.)

FOREIGN PATENT DOCUMENTS

| | | |
|---|---|---|
| EP0701194A1 | 3/1996 | (EP) . |
| 06110590 | 4/1994 | (JP) . |
| 08340500 | 12/1996 | (JP) . |
| WO 96/09574 | 3/1996 | (WO) . |

OTHER PUBLICATIONS

Bruce Brown, "Gateway Destination: The PC for The Office and the Family Room", PC Magazine article, Jun. 1996.*

Phase–locked loop; NE/SE54/Philips Semiconductors; Aug. 31, 1994; pp. 1–9.

Application Note/AN177; "An overview of the phase–locked loop (PLL)"; Philips Semiconductors; Dec. 1988; pp. 1–6.

Application Note/AN179; "Circuit Description of the NE564"; Philips Semiconductor; Dec. 1991; pp. 1–6.

Application Note/AN180; "Frequency synthesis with the NE564"; Philips Semiconductors; Dec. 1988; pp. 1–3.

(List continued on next page.)

*Primary Examiner*—Reinhard J. Eisenzopf
*Assistant Examiner*—Linus H. Lo
(74) *Attorney, Agent, or Firm*—Sharp, Comfort & Merrett, P.C.

(57) ABSTRACT

A power management system for a converged functionality apparatus enables primary control to be effected through an actuating mechanism. In general operation, the actuating mechanism switches between "on" and "suspended" states. The power management system includes various defaults, memories, and priority setting schemes that enable fully integrated, but wholly intelligent, operation of the converged functionality apparatus.

19 Claims, 2 Drawing Sheets

U.S. PATENT DOCUMENTS

| | | | |
|---|---|---|---|
| 5,675,364 * | 10/1997 | Stedman et al. | 345/211 |
| 5,736,873 * | 4/1998 | Hwang | 348/730 |
| 5,745,105 * | 4/1998 | Kim | 345/211 |
| 5,745,391 * | 4/1998 | Topor | 395/750 |
| 5,790,201 * | 8/1998 | Antos | 348/552 |
| 5,819,156 * | 10/1998 | Belmont | 455/2 |
| 5,821,924 * | 10/1998 | Kikinis et al. | 345/212 |
| 5,832,283 * | 11/1998 | Chou et al. | 395/750.01 |
| 5,838,720 * | 11/1998 | Morelli | 375/219 |
| 5,844,552 * | 12/1998 | Gaughan et al. | 345/327 |
| 5,870,613 * | 2/1999 | White et al. | 395/750.01 |
| 5,875,345 * | 2/1999 | Naito et al. | 395/750.05 |
| 5,894,331 * | 4/1999 | Yang | 348/730 |
| 5,903,765 * | 5/1999 | White et al. | 395/750.02 |
| 5,917,479 * | 6/1999 | Happakoski | 345/211 |
| 5,917,777 * | 6/1999 | Tanigawa | 345/211 |
| 6,011,592 * | 1/2000 | Vaughan et al. | 348/552 |
| 6,054,981 * | 4/2000 | Kimoto et al. | 345/211 |

OTHER PUBLICATIONS

Application Note/AN182; "Clock regenerator with crystal–controlled phase–locked loop VCO (NE564)"; Philips Semiconductors; Dec. 1991; pp. 1–10.

"Gateway 2000 Sells Destination Big Screen PC Through Retail Chains"; Internet article; Aug. 20, 1996; pp. 1–4.

"Gateway 2000 Launches Destination Big Screen PC Featuring 31–inch Monitor "; Internet article; Mar. 21, 1996; pp. 1–5.

"The Big–Tube PCTV"; PC Online/ Trends Online; May 28, 1996; pp. 1–3.

"Destination Features"; Internet article; Aug. 21, 1996; pp. 1–5.

"Telefuzion"; Internet article; Mar. 12, 1997; pp. 1–2.

"High–Tech; Now you can tune your TV to the Invernet"; Mike Snider; USA Today; Sep. 18, 1996; pp. 1–2.

EPO Search Report dated Jun. 10, 1999.

Phase–locked loop; NE/SE54/ Philips Semiconductors; Aug. 31, 1994; pp. 1–9.

* cited by examiner

POWER MANAGEMENT SCHEMES FOR APPARATUS WITH CONVERGED FUNCTIONALITIES

BACKGROUND OF THE INVENTION

1. Field of the Invention

The present invention relates generally to consumer electronics devices with converged functionalities. More particularly, the present invention relates to a power management system for personal computer/television ("PC/TV's"), which power management system causes a PC/TV in which it is incorporated to operate in a "user friendly" manner.

2. Description of the Related Art

In broad general terms, there are presently efforts underway to combine or converge functionalities of interest to users in electronic devices, both so that the resultant devices are more attractive because they are more useful, and so that consumers do not become overwhelmed by the number of devices they are urged to purchase and use. This "combining" or "converging" presents a number of challenges, economic as well as technical, which can, in turn, lead to unique, especially intelligent or fortuitous, developments.

For example, personal computers and televisions, which are combined (i.e., whose functionalities are converged) in "PC/TV's," have a number of common attributes. PC/TV developers are generally eager to exploit components underlying these attributes twice, rather than duplicate them. For example, it makes sense to use commonly required screen display elements for both the PC and TV sides of PC/TV, rather than to build a PC/TV with two screen displays. Notwithstanding the above-mentioned "eagerness" on the part of PC/TV developers, PC's and TV's behave differently in a number of respects, which makes "double exploitation" difficult.

For example, in the power management area, because both PC's and TV's require similar power supplies, it would seem a simple matter to have the PC and TV sides of a PC/TV share the same supply. However, there are a number of fundamental, general differences in the ways personal computers and televisions operate, which differences make development of an integrated, and intelligently operating, power management system extremely difficult. These differences include:

1) the fact that televisions today are generally operated by a remote control device or by buttons on the television housing, while personal computers are generally operated by software generated pull-down menus and the like, controlled by keyboards, mice, and other I/O devices connected directly to the personal computer;

2) the fact that personal computers today generally have more states than televisions. That is, while televisions are generally either on or off, personal computers may be on, off, or in a sleep or suspended state; and 3) the fact that televisions and personal computers are commonly connected to different devices. For example, VCR's are commonly connected to televisions but not to personal computers; the opposite is true in the case of joysticks. This difference can be extremely significant, especially in a case where the fact that a certain device is connected markedly modifies, or requires markedly modified, system behavior. As will become apparent from the discussion hereinbelow, such cases are not uncommon.

Another complicating element in an effort to design an integrated, intelligently designed power management system is the fact that shared resources can often not do two things at once, which fact requires that the power management system be able to prioritize actions under various circumstances, so that constituent resources are properly applied.

Still yet another complicating factor resides in the inherent difficulty of designing a remote control for both a PC/TV that is effective but foolproof (i.e., not capable of triggering or attempting to trigger a nonsensical or improper action).

In view of all of the above-listed differences and complicating factors, it should be appreciated that it is a difficult matter to design an integrated, intelligently operating, power management system for a "converged" electronics device such as a PC/TV. It should also be appreciated that having such a system would offer tremendous advantages in cost reduction and user friendliness of, e.g., PC/TV systems, and that not having such a system is a tremendous shortcoming and deficiency of the prior art.

SUMMARY OF THE INVENTION

The present invention overcomes the shortcoming and deficiency mentioned above by providing a converged electronics device such as a PC/TV including a power distribution control subsystem, which power distribution control subsystem relies on an actuating mechanism for user controlled empowering (of, e.g., the PC and TV sides of the PC/TV).

According to the teachings of the present invention, the provided power management control subsystem can accomplish some or all of the following:

1) it can switch first functional mode components, e.g., a personal computer, between an "on" and a "suspended" or "sleep" state with a simple actuator movement, e.g., one press of a power button;

2) it can continuously monitor the state of the converged electronics device, and selectively and appropriately employ, or disable, power management control functions based upon the state detected;

3) it can selectively and appropriately employ, or disable, converged electronics device functions (e.g., audio output) if certain peripheral equipment is connected to the overall system;

4) it can selectively and appropriately empower various converged electronics device components based upon a predetermined priority of operation;

5) it can determine if and when likely nonconsciously selected actions (e.g., power interruption) occur, and alter subsequent actions selected appropriately, possibly notwithstanding other factors (e.g., operational priority); and 6) it can be confined so as to render it unlikely to be unintentionally activated.

BRIEF DESCRIPTION OF THE DRAWINGS

Other advantages and novel features of the present invention can be understood and appreciated by reference to the following detailed description of the invention, taken in conjunction with the accompanying drawings in which.

DETAILED DESCRIPTION OF THE INVENTION

Figure 1:
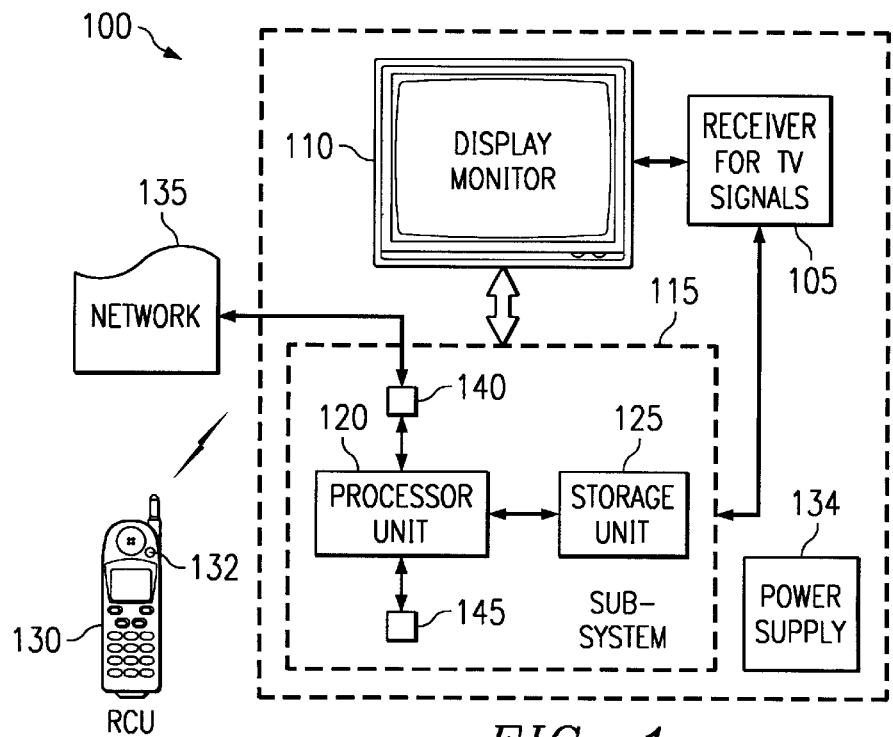
FIG. 1 is a block diagram of a PC/TV system in which an embodiment of the present invention is incorporated.

Referring now to the drawings wherein like or similar elements are designated with identical reference numerals throughout the several views, and wherein the various elements depicted are not necessarily drawn to scale, and, in particular, to FIG. 1, there is shown a block diagram of a PC/TV system, designated generally by reference numeral 100, utilizing the teachings of the present invention. The purpose of the block diagram set forth in FIG. 1 is to illustrate an exemplary environment in which an embodiment of the present invention may be practiced. The block diagram in FIG. 1 is not necessarily intended to schematically represent specific modules of hardware or any particular data or control paths therebetween.

The PC/TV system 100 includes a display monitor 110 operable to receive and display thereon television signals received by a receiver 105. The receiver 105 is capable of receiving conventional television signals in any standard form (e.g., VHF or UHF). Further, the PC/TV system 100 is provided with a sub-system 115 having a processor unit 120 coupled to a storage unit 125. The sub-system 115 may preferably contain a data communication port 140 for enabling data communication between the PC/TV system 100 and a network 135, and an access control unit 145 for controlling viewer/user access to the sub-system 115 or possibly even to the entire PC/TV system 100 itself.

Thus, it should be understood and appreciated that PC/TV system 100 provides both TV (via monitor 110 and receiver 105 interaction) and PC (via monitor and subsystem 115 interaction) functionalities.

Continuing to refer to FIG. 1, the network 135 can be understood to be any network, for example, a Local Area Network, a Metropolitan Area Network, a Wide Area Network, or the Internet. The access control unit 145 may be of the type that accepts an alphanumeric code associated with an authorized viewer/user. Although not shown in FIG. 1, it should also be understood that the display system 100 may preferably contain such hardware modules as a TV tuner board for converting signals received by the receiver 105 to a scan VGA (or higher resolution) signal for display on the display monitor 100, CD-ROM players, floppy drives, printer ports, wired or wireless keyboards, or the like. The PC/TV system 100 may preferably be operable using a remote control unit ("RCU") 130 that is provided with a power on/off button 132. The PC/TV system 100 is also preferably powered by a power unit 134 conventionally connected to components (e.g., elements 105 and 110) to be empowered via conventional power lines (not shown).

Figure 2:
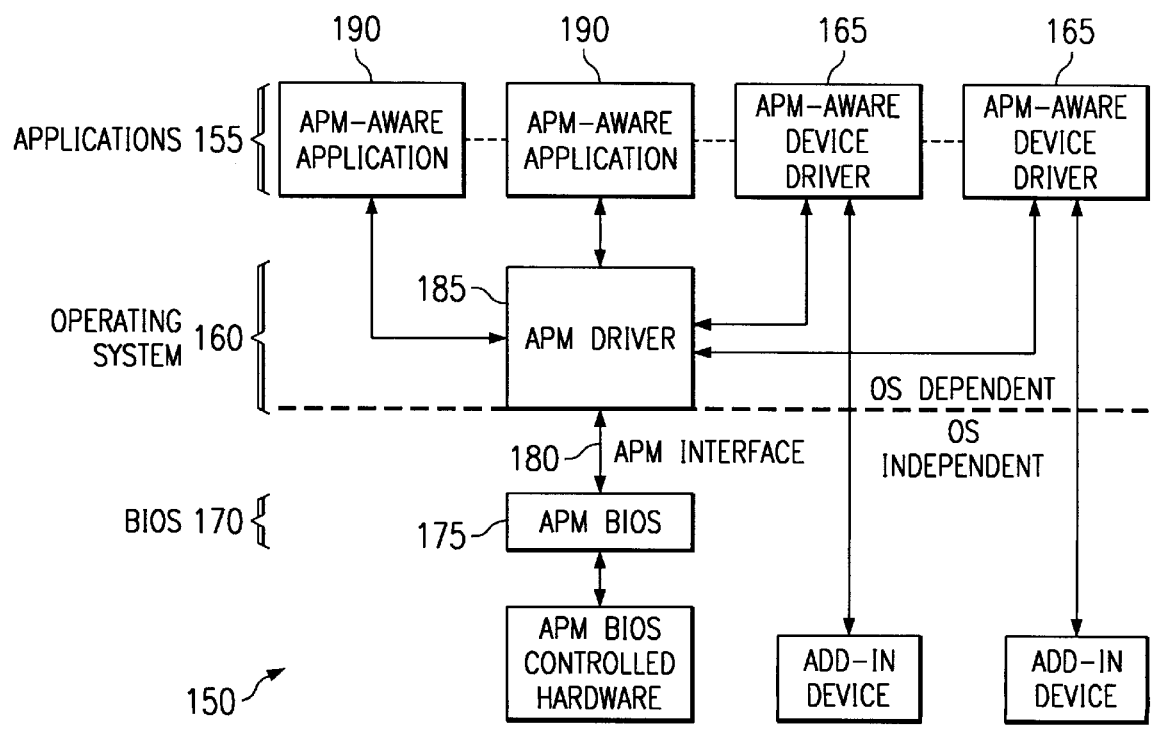
FIG. 2 is a block diagram of a power management system in which an embodiment of the present invention is incorporated.

Referring now to FIG. 2, there is shown, in block diagram form, an advanced power management system 150 in which an embodiment of the present invention may be incorporated. System 150 comprises at least one layer—and more often, multiple layers—of software that support power management in computers with power manageable hardware. System 150 effectively defines a hardware independent software interface between hardware-specific power management software and an operating system power management policy driver. System 150 also effectively masks the details of the hardware, allowing higher-level software to manage power without necessarily having any knowledge of the hardware interface.

Within system 150, applications 155, an operating system 160, device drivers 165, and power management BIOS 170 work together to reduce power consumption. The major software components of system 150 are the power management BIOS itself 175, the power management interface 180, the power management driver module 185, power management aware applications 190, and power management-aware device driver modules 165. The BIOS 175 is the software interface to the motherboard and its power managed devices and components. The interface 180 is the interaction between the driver module 185 and the BIOS 175. The module 185 is the primary controller of power management policy; module 185 communicates directly to power management-aware applications 190. The applications 190 interface with the module 185 to monitor and/or control power management. The device drivers 165 provide a power management software interface for add-in devices, i.e., any device that is not on the motherboard (such as an add-in or PCMCIA card).

System 150 controls power in two ways. First, the power management BIOS 175 (which is generally supplied by OEM's and is specific to the hardware platform) manages power in the background based on device activity. Second, the power management device 185 participates in managing power levels via function calls to the power management software interface 180. Both methods cause transitions from one power management-defined state to another, the states themselves being defined by the power level of the controlled devices and the CPU. Conventionally supported states include: 1) a "full on state," in which power is not managed; 2) an "enabled state" where the system 150 is doing work but some unused devices may not be powered; 3) a "standby state," which is entered into from the "enabled state" after a short period of inactivity (and, it should be noted, recovery from this state back into the "enabled state" appears instantaneous); 4) a "suspend state," which is like the "standby state," except it toggles to and from the "suspend state," rather than the "enabled state," and it has relatively long entry and recovery phases; and 5) an "off state."

Now that the basic environments of a PC/TV generally, and its power management subsystem in particular, have been discussed, details regarding the structure and operation of the present invention can now be readily understood and appreciated.

A primary function of the present invention, as previously discussed, is to provide systems and methods whereby a PC/TV power management subsystem contributes to causing a PC/TV to look and act (that is, "feel") like a consumer electronic television when in TV mode. Likewise, the PC/TV should "feel" like a normal desktop computer when in PC mode. Towards this end, when in PC mode the PC/TV should enter "standby" and "suspend" modes, as discussed above, as most PC computer systems in the market today do. This functionality, as a practical matter, can be provided by software resident in either the BIOS 175 or driver module 185, both of which are depicted in FIG. 2. Alternatively, an independent block of software can be incorporated into the scheme depicted in FIG. 2, provided only that it is operatively connected to other blocks of software (e.g., the BIOS 175) with which it must interact. Any one or all of these three possible schemes may be employed with any or all of the possible elements or aspects of functionality of embodiments of the present invention discussed hereinbelow.

There are a number of aspects to PC/TV operation in TV mode that contribute to the proper "feel" mentioned above. First of all, one possible aspect of an embodiment of a PC/TV according to the teachings of the present invention is the placing of the monitor (element 110 in FIG. 1) into a special overscan mode where the video picture takes up the entire screen and the PC desktop is hidden. Second, it is important that the PC/TV not "blank out" without user intervention when the PC/TV is in TV mode; to ensure this "feel" requirement is met, in TV mode power management is disabled in embodiments of the present invention, ensuring the PC/TV does not enter a "standby" or "suspend" state because of a time-out. Third, to ensure that a user thinks of the PC/TV as a properly behaving TV, TV mode may be made the default mode in embodiments of the present invention, so that the PC/TV goes directly into TV mode upon start up.

As previously mentioned, the common control for a PC/TV is a remote control unit (element 130 in FIG. 1). Certain aspects of embodiments of the present invention are embodied in the structure and operation of this unit. For example, in embodiments of the present invention, when a user hits the power button (element 132 in FIG. 1) on the remote control 130 to turn off the TV, the PC/TV is put into a "soft-off state," which is effectively the "suspend state" described above with reference to FIG. 2. That is, the PC/TV is not completely powered off. This is done so that when the user presses the power button 132 again to turn the unit on, response is nearly instantaneous, because the PC/TV does not need to completely reboot. Second, when the user presses the power button on the remote control 130, the system is brought out of "soft-off" fully powered up. Also, if the PC/TV is not already in TV mode, it is placed into TV mode at that time, once again so that the PC/TV "feels" like a consumer electronic television. Third, while virtually any input device movement "wakes up" a personal computer, in embodiments of the present invention only the power button 132 on the remote control 130 is enabled to bring the PC/TV out of "soft-off." Once again, the goal being sought here is for the PC/TV to seem primarily like a regular TV. Also, once again, these goals can be obtained via software in elements 175 or 185 in FIG. 2, or in a separately provided module.

There are two special circumstances or situations that embodiments of the present invention are specially designed to handle. One of those situations is power outage. Embodiments of the present invention are designed to boot into the last power state. Thus, in the event of a power outage, when the PC/TV reboots it will be placed back into "soft-off" after Windows (or whatever operating system is in use) starts, if that was the state it was in before being powered off. Another situation is one in which the PC/TV is in "soft-off," and some event (such as a programmed VCR recording or TV program guide download) occurs that inclines to drive the PC/TV to return to full power. In embodiments of the present invention, such events are allowed to occur, but the monitor remains in a low power state, and the system audio remains muted. This ensures that a PC/TV does not turn on, "full blast," in the middle of the night when a VCR activates recording of a program. This aspect is possible because such "events" are timed events, registered with the software that monitors power on the system (see FIG. 2). According to the teachings of the present invention, this software sets a flag before going into "soft-off state," notifying the power management, BIOS not to power up the monitor (or audio or whatever) when coming out of a suspend (or "soft-off") state. When this flag is set, the above-mentioned power management software is responsible to bring the monitor (e.g., element 110 in FIG. 1) or other elements back to full power when the user presses the power button (e.g., element 132 in FIG. 1). Such a flag is not saved through a reboot, however. Thus, if the user reboots the system while the system is in "soft-off," video is not lost. Recognizing that a PC/TV according to the teachings of the present invention is put into the last power state when entering its operating system, e.g., Windows, after a reboot, the system has video until it has booted into Windows, when it will be placed back into "soft-off." Therefore, the system has video before Windows starts, and the user may intervene before Windows is started if he or she wants to work under, e.g., DOS.

Figure 3:
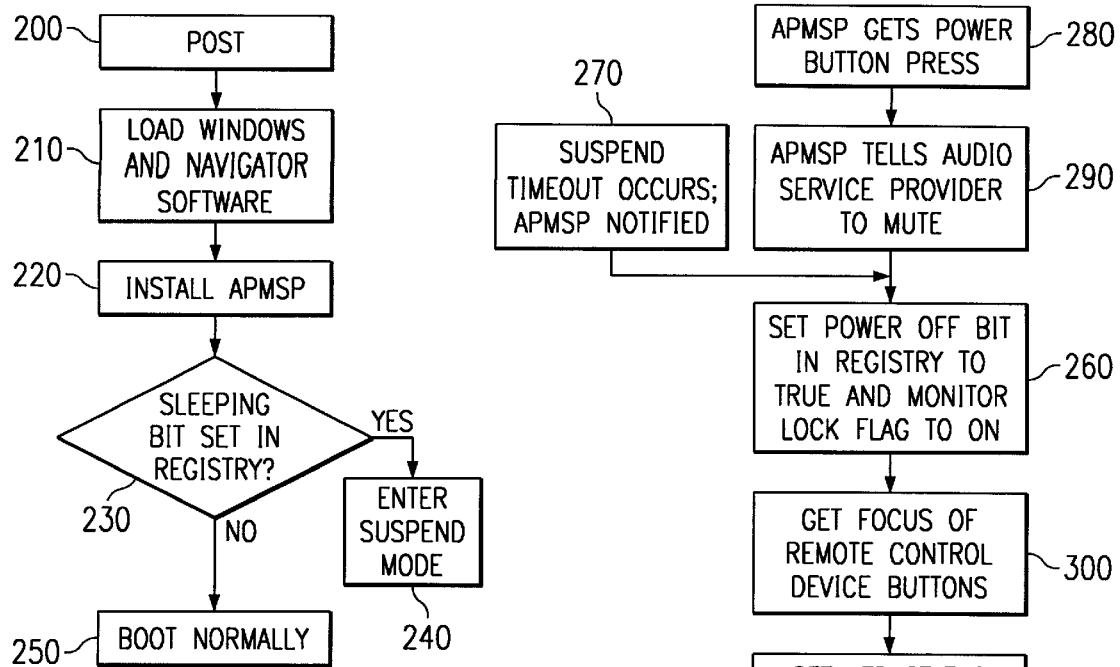
FIG. 3 is a flow chart of a power management initialization procedure in accordance with the teachings of the present invention.
Figure 4:
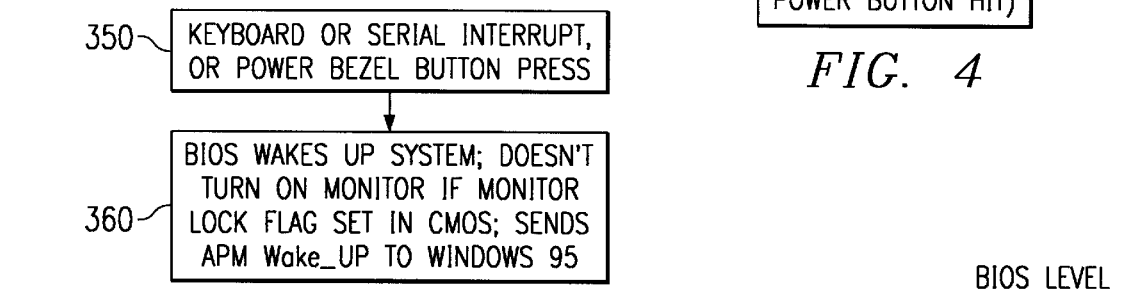
FIG. 4 is a flow chart of a power management power-off procedure in accordance with the teachings of the present invention.
Figure 5:
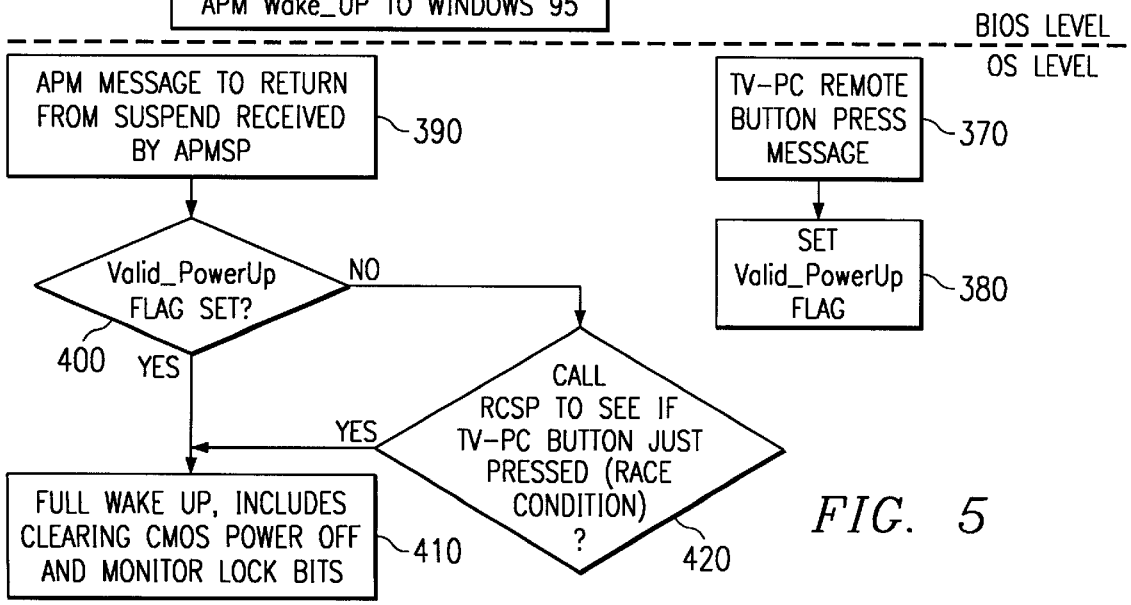
FIG. 5 is a flow chart of a return from suspend mode procedure in accordance with the teachings of the present invention.

FIGS. 3–5 provide some additional insight into software logic in embodiments of the present invention.

FIG. 3 depicts, in flow chart form, a power management initialization procedure according to the teachings of the present invention. This procedure begins with a power on self test (step 200), followed by a loading of the operating system (e.g. Windows) and television control (e.g., Navigator) software (step 210), and further followed by an installation of power management software (step 220). Next, to ensure that the system powers up into the correct state (e.g., a suspended state or a normally operating state) the software determines whether a sleeping bit is set in a registry (i.e., the system refers to means to determine whether it should power up into a soft-off state, as discussed above, whether those means involve bits, flags, or whatever indicating signals) at step 230. If yes, the PC/TV enters suspend mode (step 240). If not, the PC/TV boots normally (step 250).

The registry mentioned above with respect to step 230 in FIG. 3 can, in embodiments of the present invention, effectively be a register for button press messages. This is possible because most important user-controlled state changes in embodiments of the present invention occur as a result of a actuator switch (e.g., power button press). Being so limited, control is facilitated.

Referring now to FIG. 4, there is depicted, in flow chart form, a power management power-off procedure according to the teachings of the present invention. This procedure involves setting an off bit in a "registry" (discussed above) and indicating locking of the monitor (step 260). This step is effected either if a suspend time out occurs (when the PC/TV is in a PC mode only) (step 270), or when the power button is pressed when the PC/TV is on (step 280). In the latter event, the power management software also causes audio muting (step 290). In either event, in fact, muting occurs. Continuing power-off after step 260, the power management software gains focus of the power device buttons from remote control software (step 300), visually indicates the power-off state (step 310), and advises all other software, e.g., the PC power management software depicted in FIG. 2, of the state change (step 320).

Referring now to FIG. 5, there is shown a block diagram chart of a return from suspend mode procedure according to the teachings of the present invention. At the BIOS level, two events are noteworthy. First, upon an interrupt or power button press (step 350), the BIOS wakes up the system and sends a wake-up signal to the PC (step 360). It is important to note that the BIOS does not here turn on the monitor if locked off. On the operating system level, different events occur depending upon the source of the "wake up" call. If the "wake up" call comes from the remote control 130 (in the form of a power button press) (step 370), the power up is immediately recognized as valid by setting a valid power up flag or like validating and indicating means (step 380). If the return from suspend mode signal comes from the PC power management software (step 390), on the other hand, the PC/TV power management software checks to see whether the system has been validated to power up (step 400). If yes, the system is powered up (step 410). If not, the PC/TV power management software looks to remote control software to see if the power button was pressed (step 420). If yes, the system wakes up (step 410). If not, the system remains in suspended mode. The reason for this is so that one can virtually ensure that a PC/TV does not inadvertently power up.

Based upon the foregoing, it should now be fully understood and appreciated how embodiments of the present invention intelligently integrate power management functions of the two disparent devices combined into a PC/TV. Because of various aspects in the structure and/or operation of embodiments of the present invention, a PC/TV can be made user friendly because a single power button press can switch a computer between an "on" and "suspended" (v. "off") state. This causes the computer, if desired, to appear to power up instantaneously. That same power button defaults to power up the TV, which makes the overall PC/TV system seem like an especially empowered TV, which is the primary piece of electronics equipment it is replacing. In embodiments of the present invention, when the system powers down totally (e.g., because power failed), it checks to see what state it was in before losing power (which is especially important if the system was in the suspend mode) and it returns to that state. This ensures that if power is lost in the middle of the night, the system does not power up with the TV blaring. Embodiments of the present invention also distinguish between modes; when in TV mode the system is not allowed to time out power down. When the system is powered up to do a VCR record or the like, the monitor and audio components are kept "off," unless the user instructs otherwise, to ensure the system is not empowered to a higher level than is desired or is desirable. Also, since power management is limited to a single button, e.g., button 132 (which can be recessed or otherwise protected), the chances of inadvertent tripping the system on are reduced.

Obviously, numerous modifications and variations are possible in view of the teachings above. Accordingly, the present invention is not limited by the embodiments disclosed, but is capable of numerous rearrangements, modifications, and substitutions, without departing from the spirit and scope of the invention as set forth and defined by the following claims. For example, while the embodiment described in detail above includes a button 132, embodiments of the present invention could just as easily employ a switch, knob, dial, or other such "actuating" subsystem. Accordingly, the term "button" as used herein should be understood to encompass all such means for switching between two, or more, states. Furthermore, while a PCTV system is discussed herein in detail, power management schemes according to the teachings of the present invention can be incorporated into any number of "converged" functionality devices, such as PC/game systems, PC/telephone systems, or the like. Any and all of such systems should be understood to be covered by various of the appended claims. In fact, any combination of the priority, protection, switching, monitoring, control, empowering, altering, and other such aspects of the present invention can possibly be usefully incorporated into a system combining first and second functionalities to prioritize, protect, switch, monitor, control, empower, alter, or the like, all or part of the system; any such system is covered by the appended claims.

What is claimed is:

1. A system for operating in a TV mode and in a PC mode, said system comprising:
   a PC/TV convergence component including a processor coupled to storage device, and further including a TV tuner operable in said system TV mode to generate television display scan signals;
   a display device connected to said PC/TV convergence component, said display device operable to display said television display scan signals when powered on in said system TV mode;
   a power distribution subsystem for selectively empowering said PC/TV convergence component and said display device; and
   a power distribution control subsystem for controlling power to said PC/TV convergence component, and for controlling power to said display device,
   wherein said power distribution control subsystem is configured to cause said PC/TV convergence component and the display device to operate in an on state and a suspend state, and wherein said power distribution control subsystem causes said PC/TV convergence component to change from the suspend state to the on state responsive to at least one selected TV mode wake-up event, and wherein said display device remains in the suspend state responsive to the selected TV mode wake-up event;
   and wherein said power distribution control subsystem is configured to cause said PC/TV component and said display device to switch from the suspend state to the on state only in response to a validated PC power distribution system invoked wake up event or to operation of a user actuable device.

2. A system as recited in claim 1, wherein said power distribution control subsystem comprises a remote control unit for controlling said power distribution control subsystem.

3. A system as recited in claim 1, wherein said power distribution control subsystem comprises operational logic that causes said power distribution control subsystem to switch back and forth between an on state and a standby state in response to operation of an actuating mechanism.

4. A system as recited in claim 1, further comprising a convergence device;
   wherein the wake-up event is indicated by an input from said convergence device.

5. A system as recited in claim 3, further comprising:
   a memory device connected to the power distribution control subsystem, the memory device for storing an indicator of whether the power distribution control subsystem is configured to cause the PC/TV and the display device to operate in an on state or a suspend state;
   wherein the indicator is stored prior to power-down so that said power distribution control subsystem can return said PC/TV components to a power state represented by the indicator upon power-up, wherein said display device is operable in the suspend state upon power-up independent of the indicator.

6. A system as recited in claim 1, wherein said TV/PC convergence component includes television components.

7. A system as recited in claim 1, wherein said TV/PC convergence component includes video game components.

8. A system as recited in claim 1, wherein said TV/PC convergence component includes a video outputting apparatus.

9. A system as recited in claim 8, wherein said video outputting apparatus comprises a video telephone.

10. A system as recited in claim 8, wherein said video outputting apparatus comprises a video playback device.

11. A system as recited in claim 8, wherein said video outputting apparatus comprises a video recording device.

12. A system as recited in claim 8, wherein said video outputting apparatus comprises a video recording and playback apparatus.

13. A system for operating in a TV mode and in a PC mode, said system comprising:

a PC/TV convergence component including a TV tuner operable in said system TV mode to generate television display scan signals;

a display device connected to said PC/TV convergence component, said display device operable to display said television display scan signals when powered on in said system TV mode;

a software operable power distribution subsystem for selectively empowering said PC/TV convergence component and said display device;

a power distribution control subsystem for controlling power to said PC/TV convergence component and for controlling power to said display device in response to selected operational events of said system, and in response to operation of a user actuable device;

wherein said power distribution control subsystem is configured to switch said PC/TV convergence component and the display device between at least an off state, an on state, and a suspend state, and to switch said PC/TV convergence component and the display device to a suspend state after a predetermined period of activity when said system is operating in said PC mode but not when said system is operating in said TV mode;

a memory device operatively associated with the power distribution control subsystem, the memory device storing an indicator of whether the power distribution control subsystem is configured to switch the PC/TV and the display device from an off state to operate in the on state or in the suspend state;

wherein the indicator is stored prior to power-down so that said power distribution control subsystem can return said PC/TV components to a power state represented by the indicator upon power-up, wherein when returned power state is a suspend state, said display device is operable by said user actuable device to switch from the suspend state to the on state; and wherein said power distribution control subsystem causes said PC/TV convergence component to change from the suspend state to the on state responsive to one or more selected TV mode wake-up events, and wherein said display device remains in the suspend state responsive to a said selected TV mode wake-up event;

and wherein said power distribution control subsystem is configured to cause said PC/TV component and said display device to switch from the suspend state to the on state only in response to a validated PC power distribution system invoked wake up event or to operation of said user actuable device.

14. A system as recited in claim 13, wherein said software operable power distribution subsystem is controlled by power management application software in conjunction with power management BIOS.

15. A system as recited in claim 13, wherein said selected TV mode wake up events include at least one preprogrammable timed event registered with said power distribution control subsystem.

16. A system as recited in claim 13, wherein switching of said display device to the suspend state also causes corresponding muting of an audio component.

17. A system as recited in claim 13, wherein operation of said user actuable device to switch the PC/TV convergence component from a suspend state to an on state automatically causes system operation in said TV mode.

18. A system as recited in claim 13, wherein in said TV mode, the display device is operated in an overscan mode.

19. A system for operating in a TV mode and in a PC mode, said system comprising:

a PC/TV convergence component including a TV tuner operable in said system TV mode to generate television display scan signals;

a display device connected to said PC/TV convergence component, said display device operable to display said television display scan signals when powered on in said system TV mode;

a software operable power distribution subsystem for selectively empowering said PC/TV convergence component and said display device;

a power distribution control subsystem for controlling power to said PC/TV convergence component and for controlling power to said display device in response to selected operational events of said system and in response to operation of a user actuable device;

wherein said power distribution control subsystem is configured to switch said PC/TV convergence component and the display device between at least an off state, an on state, and a suspend state, and to switch said PC/TV convergence component and the display device to a suspend state after a predetermined period of activity when said system is operating in said PC mode but not when said system is operating in said TV mode;

in said system TV mode, (a) operation of the user actuable switch device to switch the PC/TV convergence component from an on state switches the PC/TV convergence component and the display device to said suspend state, and (b) switching of the PC/TV convergence component to an on state from a suspend state is enabled only by operation of the user actuable switch device;

a memory device operatively associated with the power distribution control subsystem, the memory device storing an indicator of whether the power distribution control subsystem is configured to switch the PC/TV and the display device from an off state to operate in the on state or in the suspend state;

wherein the indicator is stored prior to power-down so that said power distribution control subsystem can return said PC/TV components to a power state represented by the indicator upon power-up, wherein when returned power state is a suspend state, said display device is operable by said user actuable device to switch from the suspend state to the on state; and wherein said power distribution control subsystem causes said PC/TV convergence component to change from the suspend state to the on state responsive to one or more selected TV mode wake-up events, and wherein said display device remains in the suspend state responsive to a said selected TV mode wake-up event;

and wherein said power distribution control subsystem is configured to cause said PC/TV component and said display device to switch from the suspend state to the on state only in response to a validated PC power distribution system invoked wake up event or to operation of said user actuable device.

* * * * *